US009623764B2

(12) United States Patent
Chiu et al.

(10) Patent No.: US 9,623,764 B2
(45) Date of Patent: Apr. 18, 2017

(54) CHARGING AND DISCHARGING SYSTEM OF A VEHICLE POWER STORAGE DEVICE

(71) Applicant: Simplo Technology Co., Ltd., Hsinchu County (TW)

(72) Inventors: Kuo-Hua Chiu, Keelung (TW); Chih-Hong Lin, New Taipei (TW); Chih-Hao Kan, Taoyuan (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 139 days.

(21) Appl. No.: 14/718,099

(22) Filed: May 21, 2015

(65) Prior Publication Data

US 2015/0367745 A1 Dec. 24, 2015

(30) Foreign Application Priority Data

Jun. 19, 2014 (TW) .............................. 103121258 A

(51) Int. Cl.
*H02J 7/16* (2006.01)
*H02J 7/04* (2006.01)
*B60L 11/18* (2006.01)

(52) U.S. Cl.
CPC ....... *B60L 11/1861* (2013.01); *B60L 11/1816* (2013.01)

(58) Field of Classification Search
CPC .......... H02J 7/0021; H02J 7/0068; H02J 3/14; H02J 7/007; H02J 7/042
USPC ........................................................ 320/109
See application file for complete search history.

(56) References Cited

U.S. PATENT DOCUMENTS

| 2007/0075684 | A1* | 4/2007 | Liu | ........................ | H02J 7/0031 320/128 |
| 2007/0188950 | A1* | 8/2007 | Liu | ......................... | H02H 7/18 361/54 |

* cited by examiner

*Primary Examiner* — Nghia Doan
(74) *Attorney, Agent, or Firm* — Winston Hsu; Scott Margo

(57) ABSTRACT

A charging and discharging system of a vehicle storage device utilizes a buffer device adapted for voltage adjustment toward a charging voltage of a charging device on the vehicle, and also for adjusting the charging current, in such a way that the charging voltage and current from the charging device may be reduced in advance for charging the storage device. With the charging and discharging system, storage device using lithium ion battery cell may be adapted to various vehicle system.

20 Claims, 8 Drawing Sheets

CHARGING AND DISCHARGING SYSTEM OF A VEHICLE POWER STORAGE DEVICE

BACKGROUND OF THE INVENTION

1. Field of the Invention

The present invention relates to a charging and discharging system, and more particularly, to a charging and discharging system of a vehicle power storage device.

2. Description of the Prior Art

With the advancement of technology and rise of environmental consciousness, improvement of power consumption of a vehicle has become an essential objective in the field. In addition to considering using vehicles with various reachable power sources, such as electric bicycles, electric motorcycles, and hybrid cars, improving the engine efficiency or adopting idling stop technology in the vehicles has also become an aim of research for enhancing the power consumption efficiency of the vehicles.

However, with the development of various power saving vehicles, control of a vehicle is getting more complicated. A variety of specifications based on the voltage and current of the interface between the vehicle systems and the power storage devices are established. Different types of power storage devices come with different characteristics of voltage and current on their own, which makes it an important issue to figure out and design a corresponding interface between a specific vehicle system and a dedicated power storage device.

It is well known that lead-acid batteries generate instantaneous large current when activated, which has essential impact on the life of the batteries. It is much harmful for the life of the conventional lead-acid batteries with the increasing number of times to be activated when installed on vehicles since the control system on-board is improved and the concept of power saving is flourishing. Although other types of power storage devices, such as a lithium ion battery, have shown improvement to handle the battery aging issue, power storage devices of the lithium ion type are much vulnerable to the voltage issue and some additionally challenges emerge when lithium ion batteries of different specifications are implemented on the current vehicle.

For example, a charging voltage of a conventional lead-acid battery used in a motorcycle is about 14.5 volts, while a full charged voltage of a single cell of LiNiMnCo battery is about 4.2 volts. Problems show up if the LiNiMnCo battery is to be disposed on the motorcycle, which is originally designed for receiving a lead-acid battery. To put it more particularly, the voltage of three sets of the LiNiMnCo batteries in series connection is about 12.6 volts when fully charged. In this configuration, the charging voltage, 14.5 volts, designed for a system of the lead-acid battery will cause the LiNiMnCo batteries in series connection overvoltage-charged, bringing about safety and aging issue. If 4 sets of LiNiMnCo batteries in series connection are implemented in the motorcycle, the full charged voltage of the batteries is about 16.8 volts. Although a system using 4 sets of LiNiMnCo batteries in series connection may not face the safety issue due to the overvoltage charge in this configuration, each LiNiMnCo battery can be charged only to 3.6 volts, which leads to constant power shortage.

The problems mentioned above happen not only in applications that the lead-acid batteries are to be replaced by the lithium-ion batteries, but also in applications when replacements between various power storage devices and various vehicles systems are carried out. A vehicle system is made supportive for one type of power storage device usually means the vehicle system may not support another type of power storage device since different power storage devices usually have different characteristics of voltage and current. Therefore, it is an important issue to put an effort on making an adaptive conversion between various power storage devices and various vehicle systems so as to provide more flexibility for the power storage devices to be applied on various vehicle systems.

SUMMARY OF THE INVENTION

The present invention provides an adaptive buffer device for a power storage device to solve the problems mentioned above, such as voltage mismatch between a power storage device and a vehicle system, shortage of available capacity, safety, and costs.

According to an embodiment of the present invention, a charging and discharging system of a vehicle power storage device is provided and disposed on a vehicle. The charging and discharging system provides power for a load of the vehicle. The charging and discharging system includes a power storage device, a charging device, and a buffer device. The charging device is coupled in series with the power storage device. The buffer device is coupled in series between the charging device and the power storage device. The buffer device includes a discharging loop and a charging loop. The power storage device provides power for the load through the discharging loop. The charging loop is connected in parallel with the discharging loop. The charging device charges the power storage device through the charging loop. The charging loop includes a buffer circuit and a buffer control unit. The buffer circuit includes a switch and a buffer component coupled in series with the switch. The buffer circuit establishes a buffer voltage in the charging loop. The buffer control unit is used for detecting a voltage drop between a charging voltage of the charging device and a voltage of the power storage device. When the voltage drop is greater than or equal to a predetermined voltage value, the buffer control unit turns on the switch such that a charging current of the charging device flows through the buffer component and charges the power storage device.

According to the charging and discharging system in the embodiment of the present invention, the predetermined voltage value is a voltage drop between the charging voltage of the charging device and a secure charging voltage of the power storage device. The secure charging voltage of the power storage device is equal to or below a fully charged voltage of the power storage device.

According to the charging and discharging system in the embodiment of the present invention, the buffer component includes a diode set. The diode set establishes a forward bias voltage such that the buffer circuit establishes the buffer voltage in the charging loop. The diode set includes at least a diode.

According to the charging and discharging system in the embodiment of the present invention, the buffer component includes a resistance, such that the buffer circuit establishes the buffer voltage in the charging loop.

According to the charging and discharging system in the embodiment of the present invention, the buffer component includes a diode set and a resistance, the diode set establishes a forward bias voltage such that the buffer circuit establishes the buffer voltage in the charging loop. The resistance is coupled in series to the switch and the diode set.

According to the charging and discharging system in the embodiment of the present invention, the resistance is coupled in series between the diode set and the switch.

According to the charging and discharging system in the embodiment of the present invention, the resistance is coupled in series between the diode set and the power storage device.

According to the charging and discharging system in the embodiment of the present invention, the buffer component includes an inductance. The buffer control unit is used for monitoring the charging current of the charging device after turning on the switch. The buffer control unit turns off the switch when the charging current reaches a predetermined current value or the voltage drop is below the predetermined voltage value. The predetermined current value is below or equal to a maximum current tolerance of the switch and the inductance.

According to the charging and discharging system in the embodiment of the present invention, the buffer control unit includes a first resistance and a second resistance.

According to the charging and discharging system in the embodiment of the present invention, the buffer control unit comprises a diode or a Zener diode.

According to the charging and discharging system in the embodiment of the present invention, the charging and discharging system further includes a quick charging control unit. The charging loop further includes a quick charging loop having a quick charging switch. The quick charging loop is coupled in parallel with the charging loop. The quick charging control unit is coupled to the quick charging switch for turning on the quick charging switch such that the charging current of the charging device flows through the quick charging loop and charging the power storage device.

According to the charging and discharging system in the embodiment of the present invention, the quick charging control unit is used for detecting the voltage of the power storage device and for turning on the quick charging switch when the voltage of the power storage device is below a first predetermined value.

According to the charging and discharging system in the embodiment of the present invention, the power storage device includes a plurality of battery cells. The quick charging control unit is used for detecting a voltage of each battery cell and for turning on the quick charging switch when the voltage of each battery cell is below a second predetermined value.

According to the charging and discharging system in the embodiment of the present invention, the switch is a MOS-FET, an NPN transistor, or a PNP transistor.

According to the charging and discharging system in the embodiment of the present invention, the buffer device further includes a capacitance coupled in parallel with the discharging loop and the charging loop.

According to the charging and discharging system in the embodiment of the present invention, the discharging loop includes a Schottky diode.

According to the charging and discharging system in the embodiment of the present invention, the power storage device includes a plurality of li-ion battery cells coupled in series.

The present invention provides an adaptive buffer device for a power storage device for providing an adaptive conversion between various power storage devices and various vehicle systems to solve the above mentioned problems so that various power storage devices can be adapted to various vehicle systems. Meanwhile, the functionality and safety of the power storage device are well maintained.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." In addition, the terms "couple" and "connect" are intended to mean either an indirect or direct electrical/mechanical connection. Thus, if a first device is coupled to a second device, that connection maybe through a direct electrical/mechanical connection, or through an indirect electrical/mechanical connection via other devices and connections.

Figure 1:
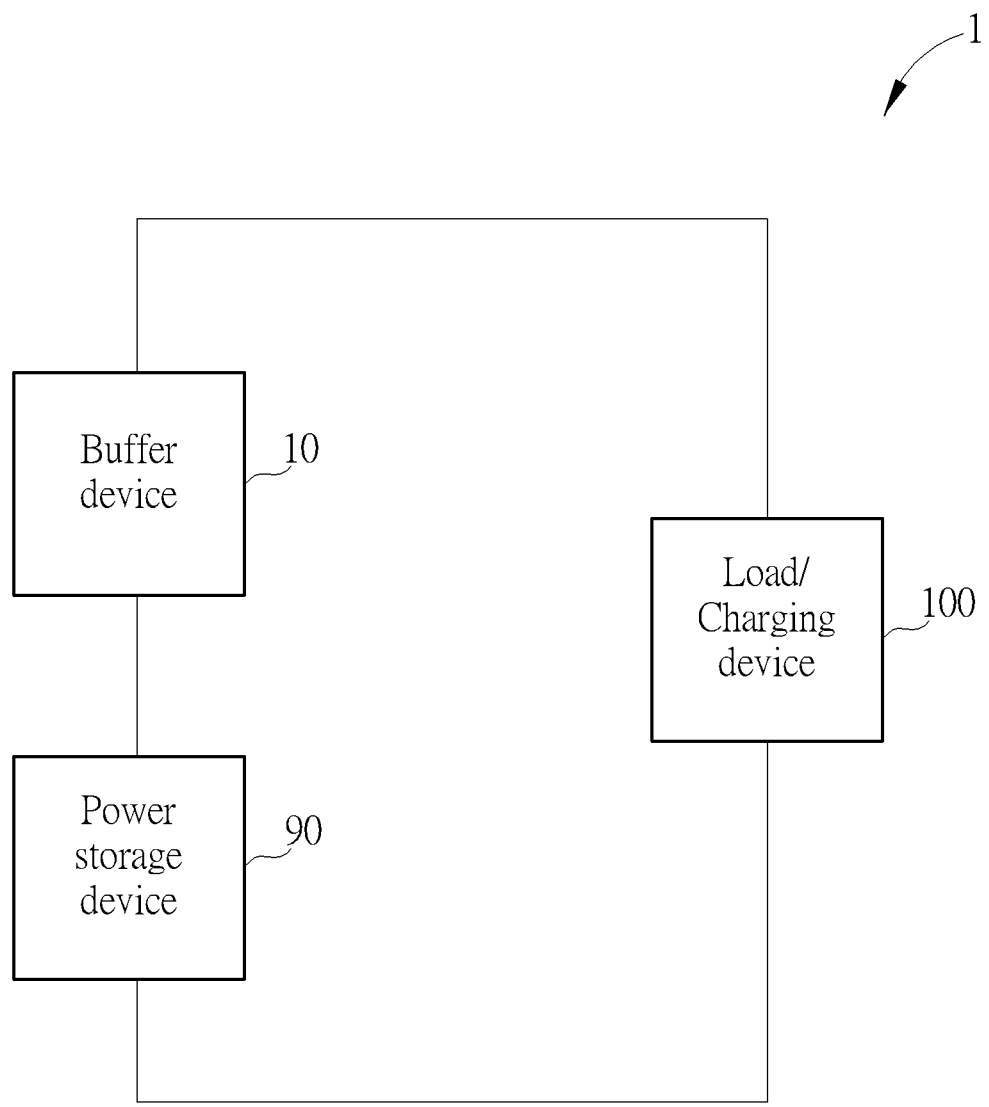
FIG. 1 is a functional block diagram of a charging and discharging system of a vehicle power storage device of the present invention.

Please refer to FIG. 1. FIG. 1 is a functional block diagram of a charging and discharging system of a vehicle power storage device of the present invention. A charging and discharging system 1 is disposed on a vehicle and includes a buffer device 10, a charging device 100, and a power storage device 90. The charging device 100 can be a generator device on the vehicle. The power storage device 90 is composed of a plurality of lithium ion batteries in series connection according to the present invention. Each lithium ion has characteristics of fixed rated voltage, no memory effect, high power density, and light weight. According to an embodiment, more particularly, the power storage device 90 can be composed of LiNiMnCo batteries, LiMn batteries, LiCo batteries, LiFe batteries and so on. The power storage device 90 may also include a plurality of lithium ion batteries in both series and parallel connection. The power storage device 90 is coupled in series with the charging device 100 so that charging device 100 is capable of charging the power storage device 90 and the power storage device 90 provides power for a load of the vehicle. The buffer device 10 is coupled in series between the charging device 100 and the power storage device 90. When a charging voltage of the charging device 100 is greater than a total rated voltage of the power storage device 90, in order to prevent the power storage device 90 having lithium ion batteries from being overly charged by excessive voltage, the buffer device 10 in series connection is provided to consume the excessive voltage of the charging device 100 in advance so that the power storage device 90 may be charged with a secure charging voltage and be kept away from being overvoltage-charged after the power storage device 90 is fully charged.

Figure 2:
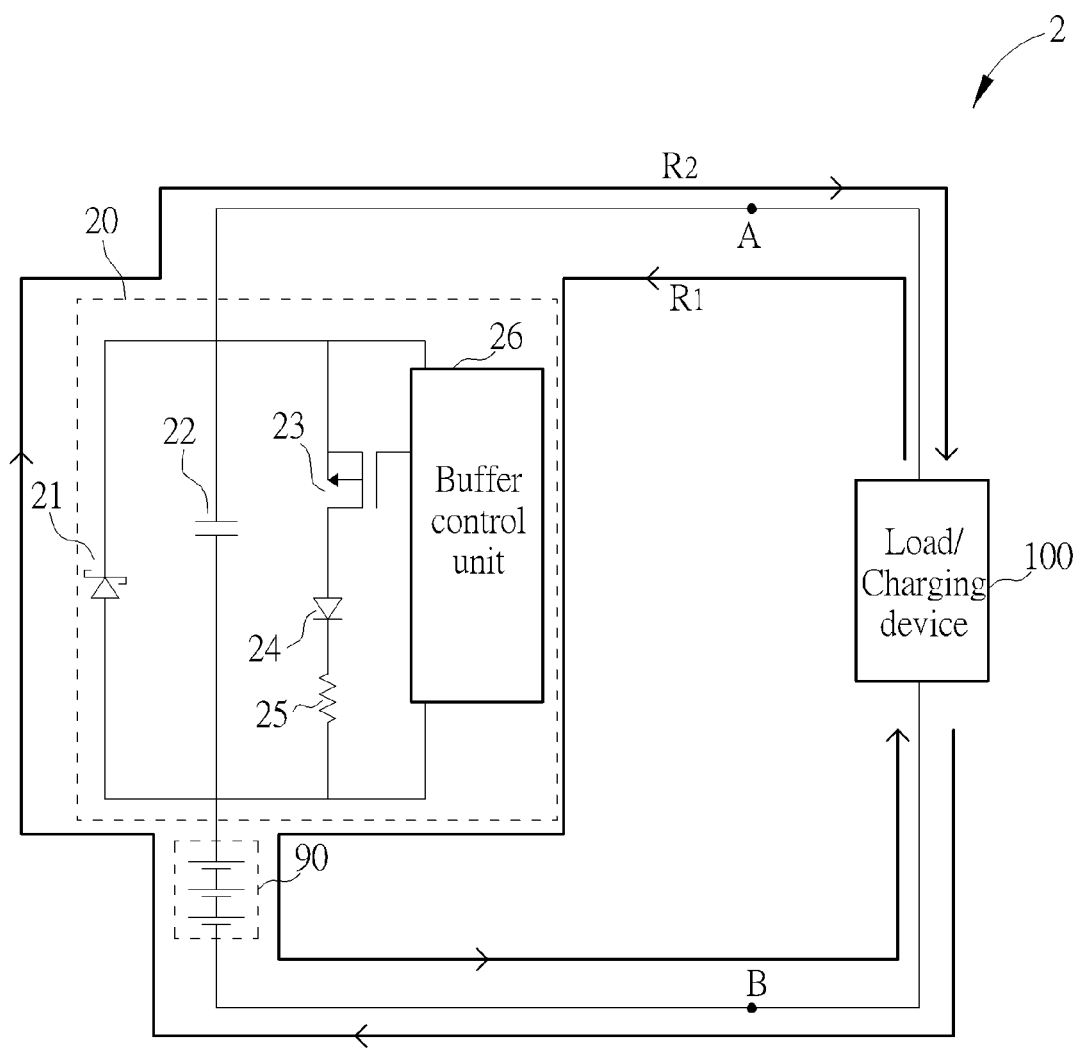
FIG. 2 is a schematic diagram of the charging and discharging system according to a first embodiment of the present invention.

Embodiments of the buffer device according to different embodiments of the present invention are illustrated as follows. Please refer to FIG. 2. FIG. 2 is a schematic diagram of the charging and discharging system according to a first embodiment of the present invention. A charging and discharging system 2 includes the charging device 100, a buffer device 20, and the power storage device 90, which are coupled in series with one another. The buffer device 20 establishes a charging loop $R_1$ and a discharging loop $R_2$ parallel to each other, between the charging device 100 and power storage device 90. The power storage device 90 provides power for the load through the discharging loop $R_2$ and the charging device 100 charges the power storage device 90 through the charging loop $R_1$. The discharging loop $R_2$ includes a Schottky diode 21. The charging loop $R_1$ includes a buffer circuit and a buffer control unit 26. The buffer circuit allows one-way current flow and a loop that includes the buffer circuit defines the charging loop $R_1$. The buffer circuit, which establishes a buffer voltage in the charging loop $R_1$, includes at least one switch 23 and a buffer component coupled in series with the switch 23. According to the embodiment as shown in FIG. 2, the buffer component includes a diode set 24 and/or a resistance 25, wherein the switch 23 can be a MOSFET and the diode set 24 is provided to establish a forward bias voltage such that the buffer circuit establishes a buffer voltage in the charging loop $R_1$.

According to the embodiment as shown in FIG. 2, the buffer device 20 further includes a capacitance 22 coupled in parallel with the discharging loop $R_2$ and the charging loop $R_1$. The capacitance 22 is disposed in the buffer device 20 so as to enhance stability of the buffer voltage in charging loop $R_1$.

The buffer control unit 26 is provided to detect the charging voltage of the charging device 100 and the voltage of the power storage device 90. When a voltage drop of the buffer device 20, a voltage drop between the charging voltage of the charging device 100 and the voltage of the power storage device 90, is greater than or equal to a predetermined voltage value, the buffer control unit 26 turns on the switch 23 such that a charging current of the charging device 100 flows through the diode set 24 and the resistance 25 and charges the power storage device 90. According to the present invention, the predetermined voltage value is a voltage drop between the charging voltage of the charging device 100 and a secure charging voltage of the power storage device 90. The secure charging voltage is set to be equal to or less than a fully charged voltage of the storage device 90. Once the charging voltage of the charging device 100 is limited by the buffer circuit in the charging loop $R_1$, the charging voltage the charging device 100 is then adapted to be proper for charging the power storage device 90.

Figure 3:
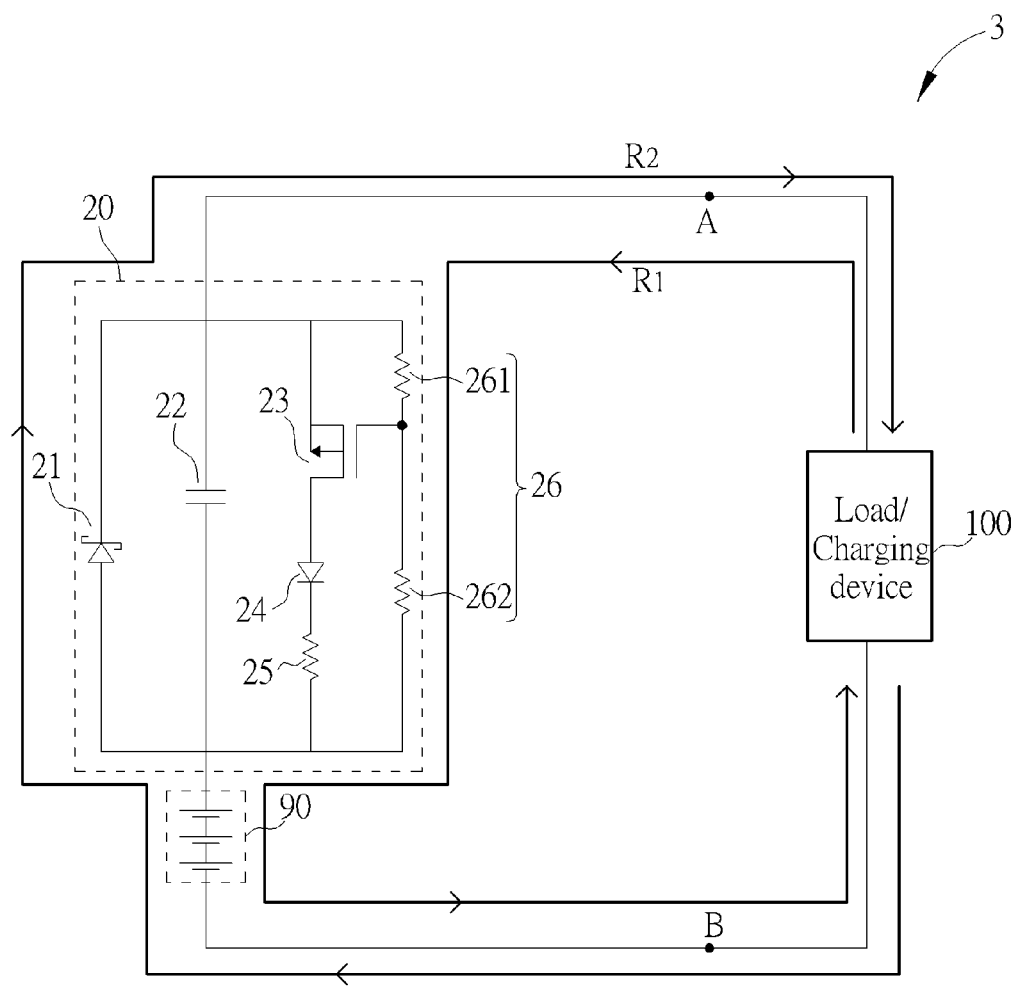
FIG. 3 is a schematic diagram of the charging and discharging system according to a second embodiment of the present invention.

Please refer to FIG. 3. FIG. 3 is a schematic diagram of the charging and discharging system according to a second embodiment of the present invention. According to this embodiment, the buffer control unit 26 of a charging and discharging system 3 includes a first resistance 261 and a second resistance 262. When the voltage drop of the buffer device 20 is greater than or equal to the predetermined voltage value, the first resistance 261 and the second resistance 262 will be in a status that the switch 23 can be turned on, through which the buffer component, including the diode set 24 and the resistance 25, establishes the buffer voltage, which is a constant value in this embodiment. According to other embodiments, the buffer control unit 26 can further include a diode or a Zener diode.

For example, when the charging voltage provided by the charging device 100 disposed on the vehicle is 14.5 volts, and the power storage device 90 includes 3S1P LiNiMnCo batteries, each of the LiNiMnCo batteries having a fully charged voltage as 4.2 volts, i.e., the total fully charged voltage of the power storage device 90 is deduced to be 12.6 volts, the charging and discharging system 3 can configure a secure charging voltage which is equal to or less than the fully charged voltage of the power storage device 90. In this embodiment, the secure charging voltage of the power storage device 90 is set to be equal to or less than 12.6 volts and when the power storage device 90 is disposed on the vehicle, the buffer device 20 will adjust the charging voltage 14.5 volts of the charging device 100 in order to prevent the power storage device 90 from overvoltage-charging, which is highly likely to bring up safety concern to the batteries. The buffer control unit 26 controls the buffer circuit to establish the buffer voltage, 2 volts for example, so that the charging voltage flowing through the buffer device 20 to charge the power storage device 90 may be limited to about 12.5 volts, avoiding a situation that the power storage device 90 should be overvoltage-charged. Additionally, the resistance 25 coupled in series between the diode set 24 and the power storage device 90 is provided to limit a charging current when the buffer circuit is put to work. The charging current is so limited that the diode set 24 will not burnout under a sharp increase in power. According to the present invention, the buffer device 20 is provided for consuming a portion of power from the charging device 100 in advance if the charging voltage of the charging device 100 is detected to be greater than the secure charging voltage of the power storage device 90. And it should be noted that the resistance 25 is also capable of restricting the consumption power.

In other embodiments, the buffer device 20 may also be applied on the power storage device 90 includes batteries in a series and parallel combination, such as 3S2P and 3S3P and the descriptions are omitted hereto.

Figure 4:
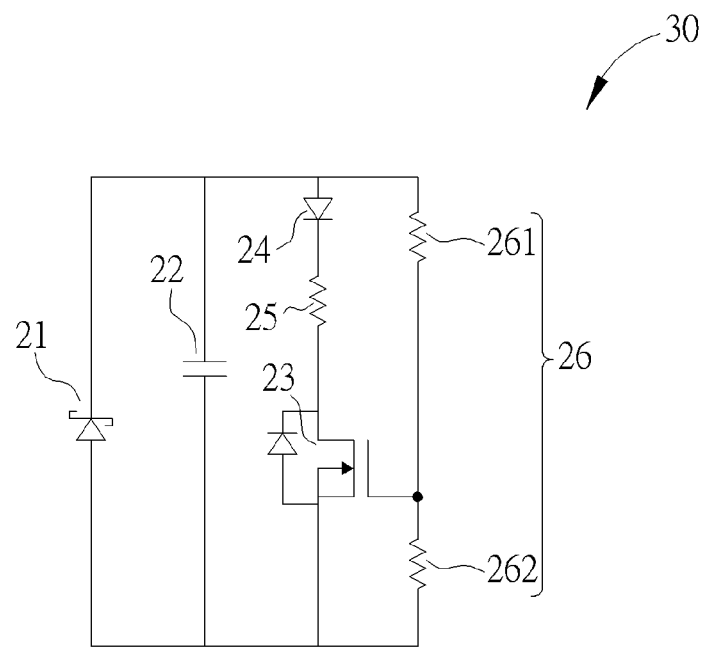
FIG. 4 to FIG. 6 are schematic diagrams of a buffer device according to different embodiments of the present invention.
Figure 5:
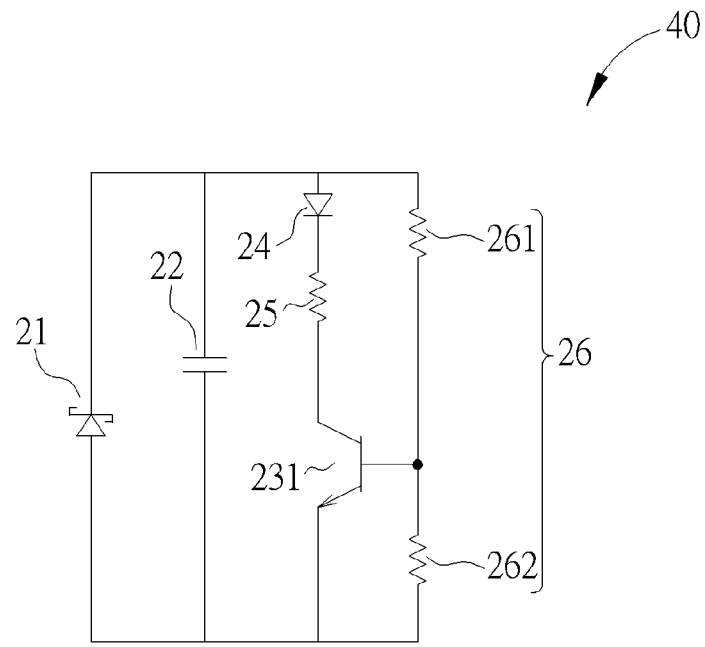
Figure 6:
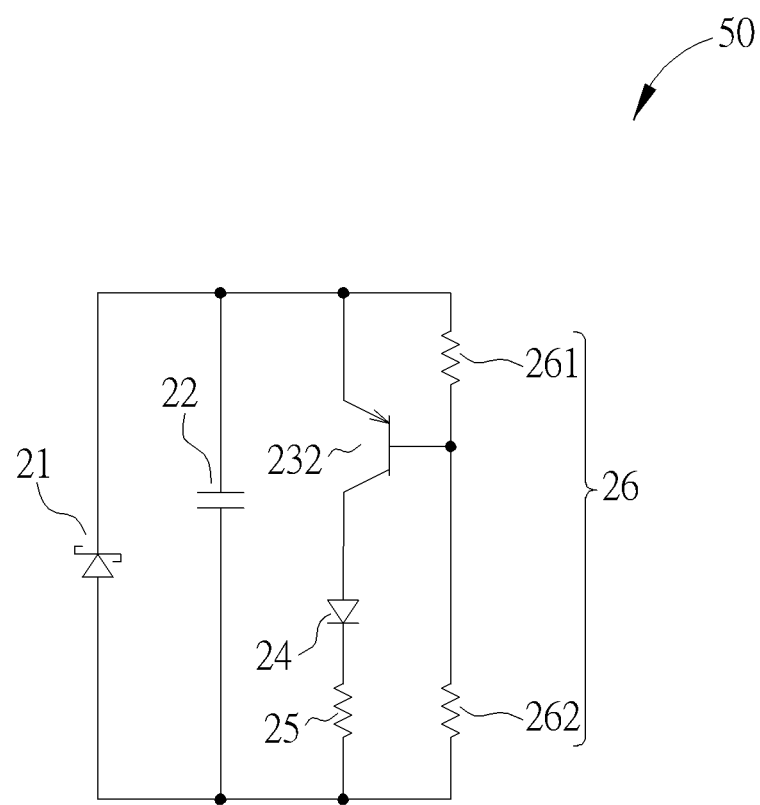

Please refer to FIG. 4 to FIG. 6. FIG. 4 to FIG. 6 are schematic diagrams of a buffer device according to different embodiments of the present invention. For a buffer device 30 according to the embodiment as shown in FIG. 4, the buffer circuit includes the switch 23, the diode set 24, and the resistance 25. The resistance 25 is coupled in series between the diode set 24 and the switch 23. For a buffer device 40 according to the embodiment as shown in FIG. 5, an NPN transistor 231 is provided as the switch and the resistance 25 is coupled in series between the diode set 24 and the NPN transistor 231. For a buffer device 50 according to the embodiment as shown in FIG. 6, a PNP transistor 232 is provided as the switch and the resistance 25 is coupled in series between the diode set 24 and the power storage device 90.

Figure 7:
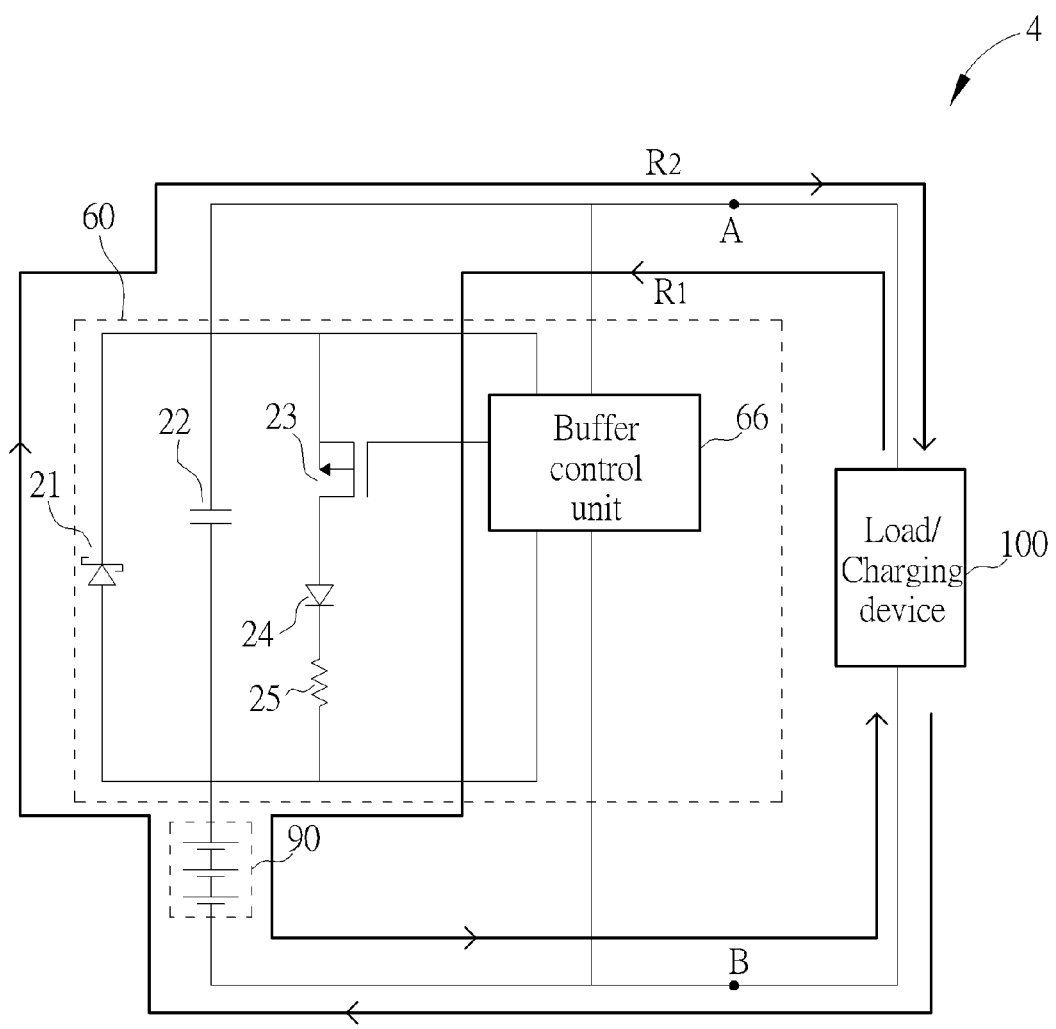
FIG. 7 is a schematic diagram of the charging and discharging system according to a third embodiment of the present invention.

Please refer to FIG. 7. FIG. 7 is a schematic diagram of the charging and discharging system according to a third embodiment of the present invention. According to the third embodiment of the present invention, a buffer control unit 66 of a buffer device 60 of a charging and discharging system 4 is capable of dynamically adjusting the buffer voltage of the buffer device 60 based on the voltage drop between the charging voltage of the charging device 100 and the voltage of the power storage device 90. The buffer control unit 66 is coupled in parallel with the charging device 100 for detecting the voltage between point A and point B and is capable of detecting the voltage status of the power storage device 90 after the power storage device 90 is disposed in the system. According to the voltage drop between the charging voltage of the charging device 100 and the voltage of the power storage device 90, the buffer control unit 66 dynamically adjusts the buffer voltage established by the switch 23 and the buffer component, exemplified as the diode set 24 and the resistance 25 in this embodiment. In such manner, the buffer control unit 66 is capable of dynamically adjusting the buffer voltage of the buffer device 60 when the voltage of the power storage device 90 is increasing during the process of charging.

An example is provided here for better understanding of the above embodiment. As the power storage device 90 has a voltage detected to be 10 volts, which has yet to reach or to be close to the secure charging voltage, and the charging voltage is provided to be 14.5 volts, the buffer voltage may be established as a less voltage drop, so that the charging device 100 can charge the power storage device 90 with 14.5 volts or near 14.5 volts through the buffer device 60. As the voltage of the power storage device 90 is increased during the charging process and getting close to the secure charging voltage 12.6 volts, the buffer control unit 66 will dynamically increase the buffer voltage until about 1.9 volts.

Furthermore, when different power storage devices 90 are disposed on a vehicle, or when a power storage device 90 is disposed on different vehicles which have different charging voltages, the buffer control unit 66 is also capable of performing an adaptive adjustment, an optimization adjustment according to different storage devices 90 and different vehicles, for the buffer voltage. In other words, the buffer control unit 66 is capable of adjusting the buffer voltage according to the voltage drop between the secure charging voltage of the power storage device 90 and the charging voltage of the charging device 100. For example, when the power storage device 90 is disposed on a vehicle, having the charging voltage to be 14.5 volts, and the power storage device 90 has the fully charged voltage to be 12.6 volts. Under such condition, the buffer control unit 66 controls the buffer device 60 to establish the buffer voltage to be at least about 2 volts, so that the charging voltage through the buffer device 60 to charge the power storage device 90 may be limited to about 12.5 volts. This example is similar to the above mentioned embodiment in FIG. 3. When the power storage device 90 is disposed on another vehicle, which may have the charging voltage as 16 volts while the fully charged voltage of the power storage device 90 remains 12.6 volts, under such another condition, the buffer control unit 66 controls the buffer device 60 to establish the buffer voltage to be at least about 3.4 volts, so that the charging voltage through the buffer device 60 to charge the storage device 90 may be limited to about 12.5 volts. When the vehicle, whose charging voltage is 14.5 volts, includes another power storage device in different specification, with the fully charged voltage 10 volts for example, the buffer control unit 66 then controls the buffer device 60 to establish the buffer voltage to be at least about 4.5 volts so that the charging voltage through the buffer device 60 to charge the power storage device 90 may be limited to about 10 volts.

Figure 8:
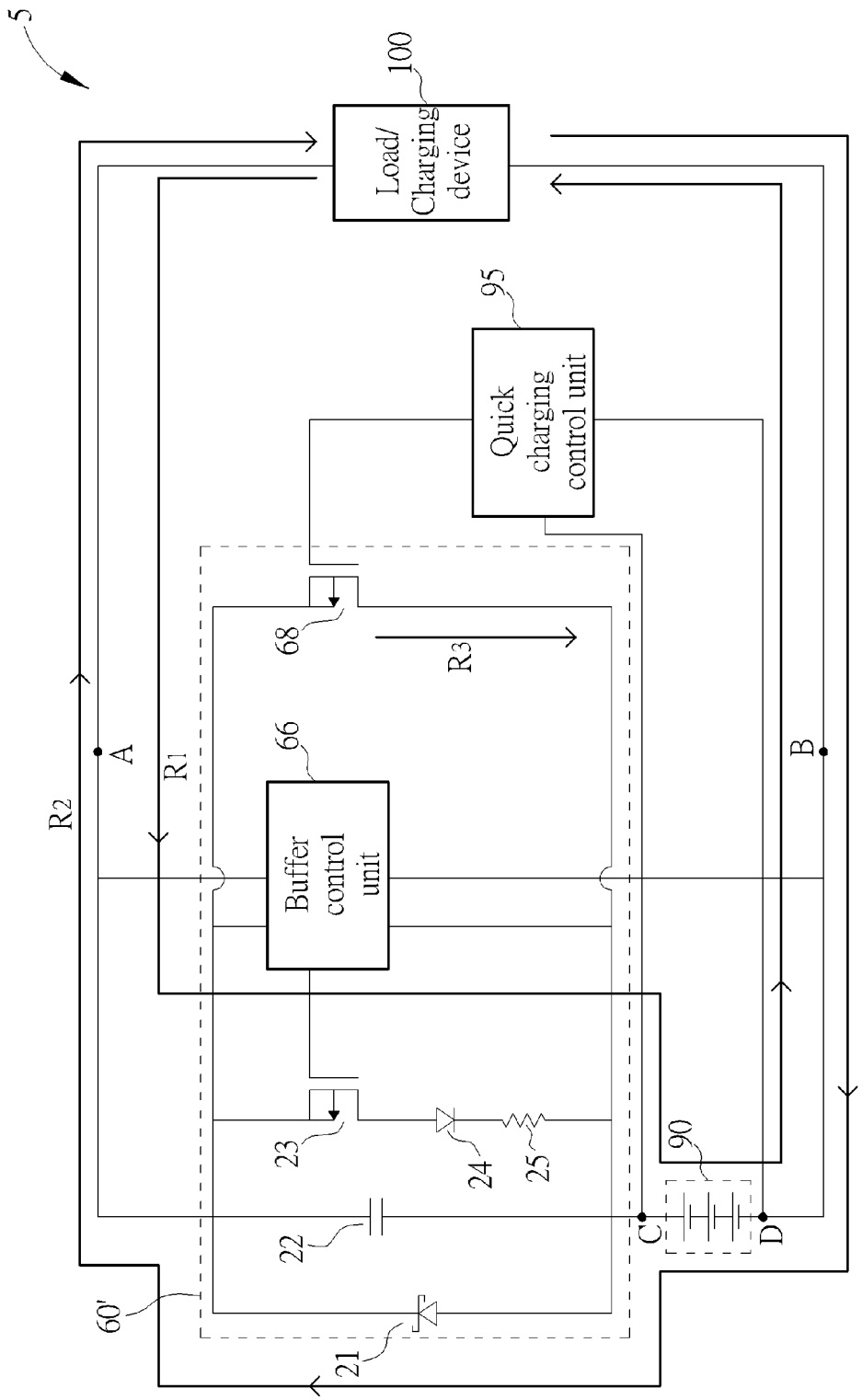
FIG. 8 is a schematic diagram of the charging and discharging system according to a fourth embodiment of the present invention.

Please refer to FIG. 8. FIG. 8 is a schematic diagram of the charging and discharging system according to a fourth embodiment of the present invention. According to the embodiment as shown in FIG. 8, a charging and discharging system 5 further includes a quick charging loop $R_3$ within the charging loop $R_1$. A quick charging control unit 95 is provided for detecting the voltage of the power storage device 90 between point C and point D, and further for determining whether to charge the power storage device 90 using the quick charging loop $R_3$ based on the voltage of the power storage device 90.

For example, when the total voltage of the power storage device 90 is less than a first predetermined value, which can be 12 volts according to the embodiment mentioned above, and/or when the voltage of each battery cell is less than a second predetermined value, which can be 4 volts, the quick charging control unit 95 turns on a quick charging switch 68 within the quick charging loop $R_3$. This method is based on the principle of determining whether the voltage drop, between the voltage of the power storage device 90 and the secure charging voltage of the power storage device 90 when the power storage device 90 is fully charged, is so great to a certain degree that the charging device 100 can charge the power storage device 90 directly with the charging device's charging current. The power storage device 90 is readily to be charged through the quick charging loop $R_3$ if the total voltage of the power storage device 90 is less than the first predetermined value and/or the voltage of each battery cell is less than the second predetermined value. If the total voltage of the power storage device 90 is greater than the first predetermined value and/or at least one of the battery cells has voltage less than the second predetermined value, the quick charging switch 68 is then turned off and the power storage device 90 will be charged through the buffer circuit of the buffer device 60'. More specifically, the buffer device 60' will deactivate the quick charging loop $R_3$ and activate the buffer circuit instead when any one of the battery cells of the power storage device 90 has its voltage close to the secure charging upper limit, where the overvoltage may occur, so as to prevent any battery cell from overvoltage-charging. Before that, the charging device 100 will directly charge the power storage device 90 using the charging current of the charging device 100 that flows through the quick charging loop $R_3$ to increase the charging efficiency, when none of the battery cells has its voltage close to the secure charging upper limit.

Figure 9:
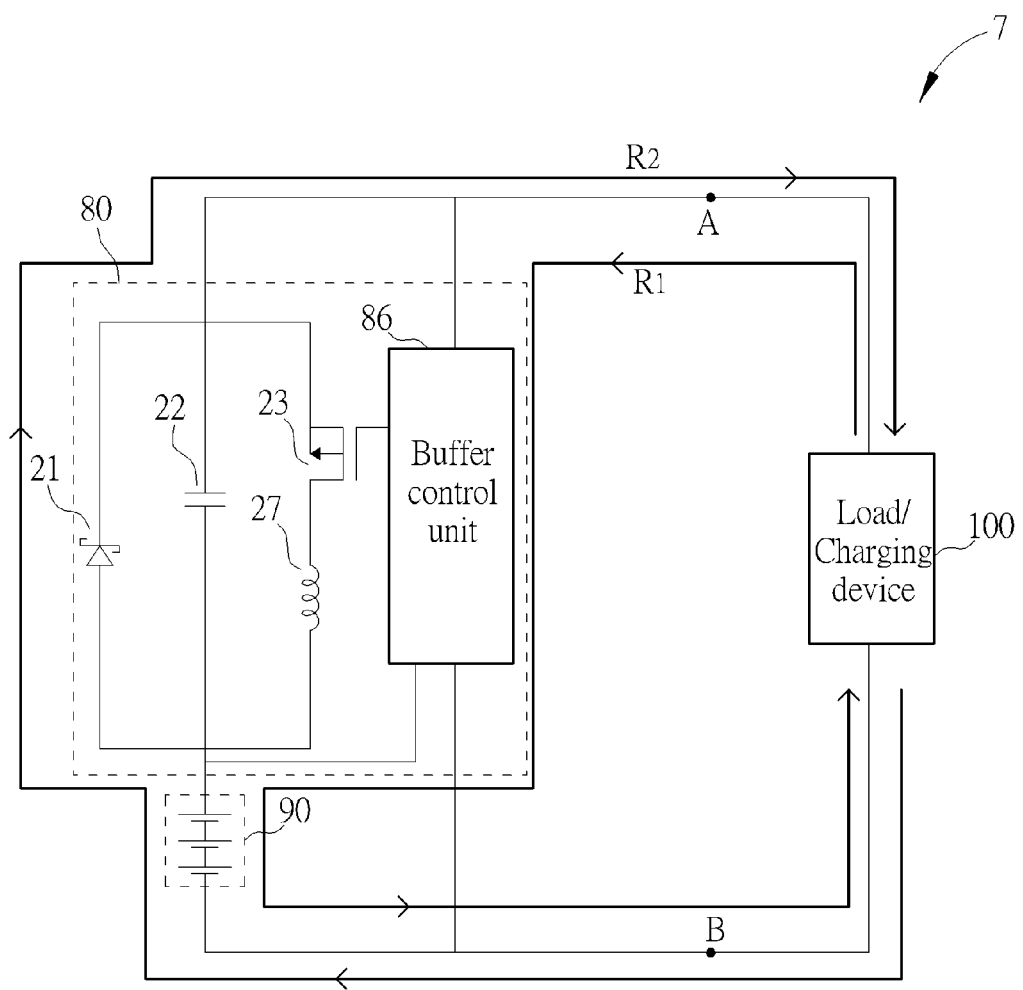
FIG. 9 is a schematic diagram of the charging and discharging system according to a fifth embodiment of the present invention.

Please refer to FIG. 9. FIG. 9 is a schematic diagram of the charging and discharging system according to a fifth embodiment of the present invention. A buffer device 90 of a charging and discharging system 7 includes a buffer component which is an inductance 27. Like the embodiment mentioned above, a buffer control unit 86 detects the charging voltage of the charging device 100 and the voltage of the power storage device 90 and turns on the switch 23 when the voltage drop of the buffer device 80 is detected to be greater than or equal to the predetermined voltage value. The inductance 27 correspondingly establishes the buffer voltage so that the charging current of the charging device 100 flows through the inductance 27 and charges the power storage device 90. Meanwhile, the buffer control unit 86 keeps monitoring the charging current after turning on the switch 23 and will turnoff the switch 23 to stop charging when the charging current reaches a predetermined current value, which is less than or equal to a maximum current tolerance that the switch 23 and the inductance 27 can take. Furthermore, when the voltage drop between the charging voltage of the charging device 100 and the voltage of the power storage device 90 is less than the predetermined voltage value, which means the power storage device 90 has been charged to the secure charging voltage, the buffer control unit 86 then turns off the switch 23 and stops charging.

The present invention provides a charging and discharging system of the power storage device utilizing a buffer device adapted for voltage adjustment toward a charging voltage of a charging device on the vehicle, and also for adjusting the charging current, in such a way that the charging voltage and current from the charging device may be reduced in advance for charging the storage device. With the charging and discharging system, storage device using lithium ion battery cell may be adapted to various vehicle system, solving the overvoltage-charging problem probably caused by the charging voltage of the charging device greater than the secure charging voltage of the power storage device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging and discharging system of a vehicle power storage device, disposed on a vehicle and providing power for a load of the vehicle, the charging and discharging system comprising:
   a power storage device;
   a charging device coupled in series with the power storage device; and
   a buffer device coupled in series between the charging device and the power storage device, the buffer device comprising:
      a discharging loop, the power storage device providing power for the load through the discharging loop; and
      a charging loop connected in parallel with the discharging loop, the charging device charging the power storage device through the charging loop, the charging loop comprising:
         a buffer circuit, comprising a switch and a buffer component coupled in series with the switch, the buffer circuit establishing a buffer voltage in the charging loop; and
         a buffer control unit for detecting a voltage drop between a charging voltage of the charging device and a voltage of the power storage device;
      wherein when the voltage drop is greater than or equal to a predetermined voltage value, the buffer control unit turns on the switch such that a charging current of the charging device flows through the buffer component and charging the power storage device.

2. The charging and discharging system of claim 1, wherein the predetermined voltage value is a voltage drop between the charging voltage of the charging device and a secure charging voltage of the power storage device.

3. The charging and discharging system of claim 2, wherein the secure charging voltage of the power storage device is equal to or below a fully charged voltage of the power storage device.

4. The charging and discharging system of claim 1, wherein the buffer component comprises a diode set, the diode set establishing a forward bias voltage such that the buffer circuit establishes the buffer voltage in the charging loop, wherein the diode set comprises at least a diode.

5. The charging and discharging system of claim 1, wherein the buffer component comprises a resistance, such that the buffer circuit establishes the buffer voltage in the charging loop.

6. The charging and discharging system of claim 1, wherein the buffer component comprises a diode set and a resistance, the diode set establishing a forward bias voltage such that the buffer circuit establishes the buffer voltage in the charging loop, wherein the resistance is coupled in series to the switch and the diode set.

7. The charging and discharging system of claim 6, wherein the resistance is coupled in series between the diode set and the switch.

8. The charging and discharging system of claim 6, wherein the resistance is coupled in series between the diode set and the power storage device.

9. The charging and discharging system of claim 1, wherein the buffer component is an inductance, the buffer control unit used for monitoring the charging current of the charging device after turning on the switch, and the buffer control unit turning off the switch when the charging current reaches a predetermined current value or the voltage drop is below the predetermined voltage value.

10. The charging and discharging system of claim 9, wherein the predetermined current value is below or equal to a maximum current tolerance of the switch and the inductance.

11. The charging and discharging system of claim 1, wherein the buffer control unit comprises a first resistance and a second resistance.

12. The charging and discharging system of claim 1, wherein the buffer control unit comprises a diode or a Zener diode.

13. The charging and discharging system of claim 1, further comprising a quick charging control unit, the charging loop further comprising a quick charging loop having a quick charging switch, the quick charging loop coupled in parallel with the charging loop, the quick charging control unit coupled to the quick charging switch for turning on the quick charging switch such that the charging current of the charging device flows through the quick charging loop and charging the power storage device.

14. The charging and discharging system of claim 13, wherein the quick charging control unit is used for detecting the voltage of the power storage device and for turning on the quick charging switch when the voltage of the power storage device is below a first predetermined value.

15. The charging and discharging system of claim 13, wherein the power storage device comprises a plurality of battery cells, the quick charging control unit used for detecting a voltage of each battery cell and for turning on the quick charging switch when the voltage of each battery cell is below a second predetermined value.

16. The charging and discharging system of claim 1, wherein the switch is a MOSFET, an NPN transistor, or a PNP transistor.

17. The charging and discharging system of claim 1, wherein the buffer device further comprises a capacitance coupled in parallel with the discharging loop and the charging loop.

18. The charging and discharging system of claim 1, wherein the discharging loop comprises a Schottky diode.

19. The charging and discharging system of claim 1, wherein the power storage device comprises a plurality of li-ion battery cells coupled in series.

20. The charging and discharging system of claim 1, wherein the power storage device comprises a plurality of li-ion battery cells coupled in series and in parallel.

* * * * *